United States Patent [19]

Marshall et al.

[11] Patent Number: 5,287,027
[45] Date of Patent: Feb. 15, 1994

[54] ELECTROMAGNETIC DRIVE FOR USE WITH VIBRATORY CONVEYORS

[75] Inventors: Kenneth M. Marshall; Arthur L. Dean, both of Indiana; Paul I. Sleppy, Penn Run; Harold E. Patterson, Indiana, all of Pa.

[73] Assignee: FMC Corporation, Chicago, Ill.

[21] Appl. No.: 786,669

[22] Filed: Nov. 1, 1991

[51] Int. Cl.⁵ .................. H02K 33/00; H02K 35/00
[52] U.S. Cl. .................................... 310/21; 310/15; 310/17; 310/29; 310/81; 198/769
[58] Field of Search ................. 310/15, 20, 17, 32, 310/21, 81, 84, 29; 198/769; 209/365.1, 368

[56] References Cited

U.S. PATENT DOCUMENTS

| | | | |
|---|---|---|---|
| 2,163,249 | 6/1939 | Sherwen | 310/81 UX |
| 2,444,134 | 6/1948 | Hittson | 310/15 UX |
| 2,694,156 | 11/1954 | Cerminara | 198/220 |
| 3,394,275 | 7/1968 | Lippmann | 310/21 UX |
| 3,522,460 | 8/1970 | Spurlin | 310/29 |
| 3,930,174 | 12/1975 | Shieh | 310/29 |
| 4,371,800 | 2/1983 | Brander | 310/15 |
| 4,405,043 | 9/1983 | Burghart | 198/769 |
| 4,749,891 | 6/1988 | Sheng | 310/15 |
| 4,994,698 | 2/1991 | Kliman et al. | 310/81 |

FOREIGN PATENT DOCUMENTS

| | | |
|---|---|---|
| 0155209 | 9/1985 | European Pat. Off. . |
| 1150198 | 4/1969 | United Kingdom . |
| 2155701 | 9/1985 | United Kingdom . |

*Primary Examiner*—R. Skudy
*Attorney, Agent, or Firm*—Douglas W. Rudy; Richard B. Megley

[57] ABSTRACT

An electromechanical exciter for use in driving a vibratory conveyor includes a non-linear spring system which provides an increase in spring force as the stroke of the electromagnet increases.

9 Claims, 5 Drawing Sheets

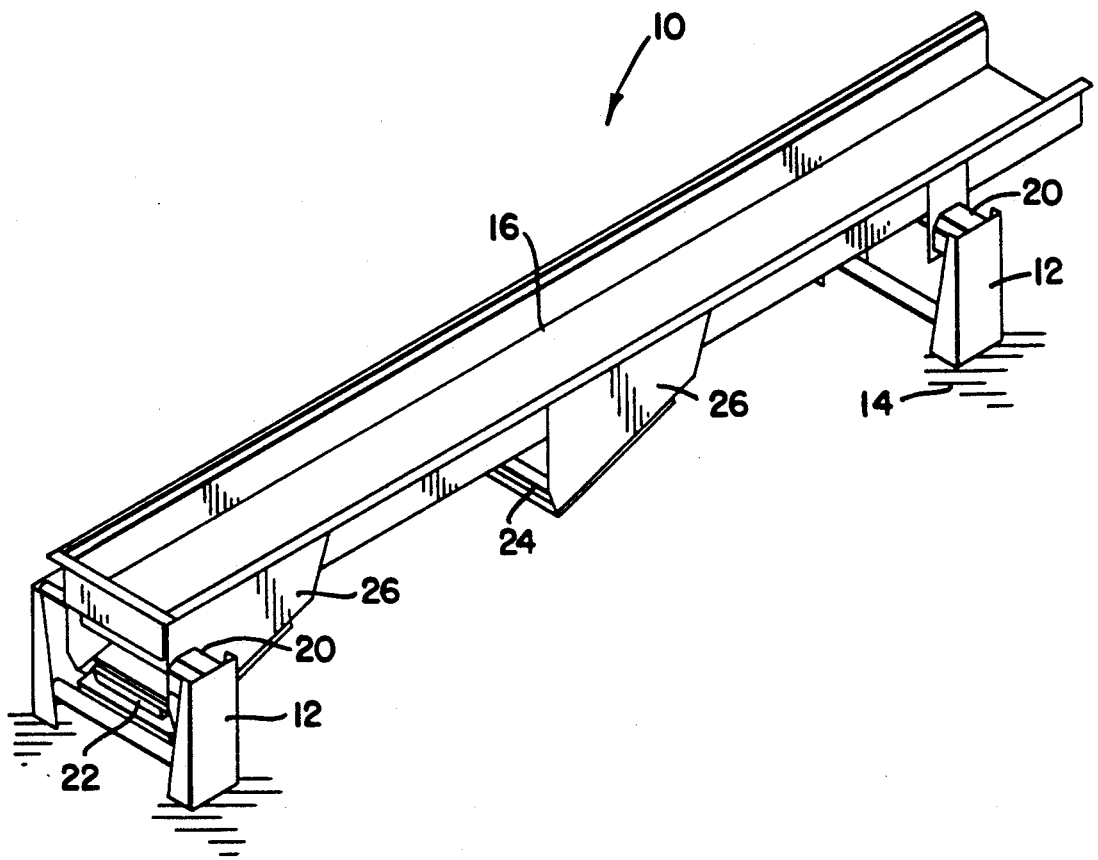

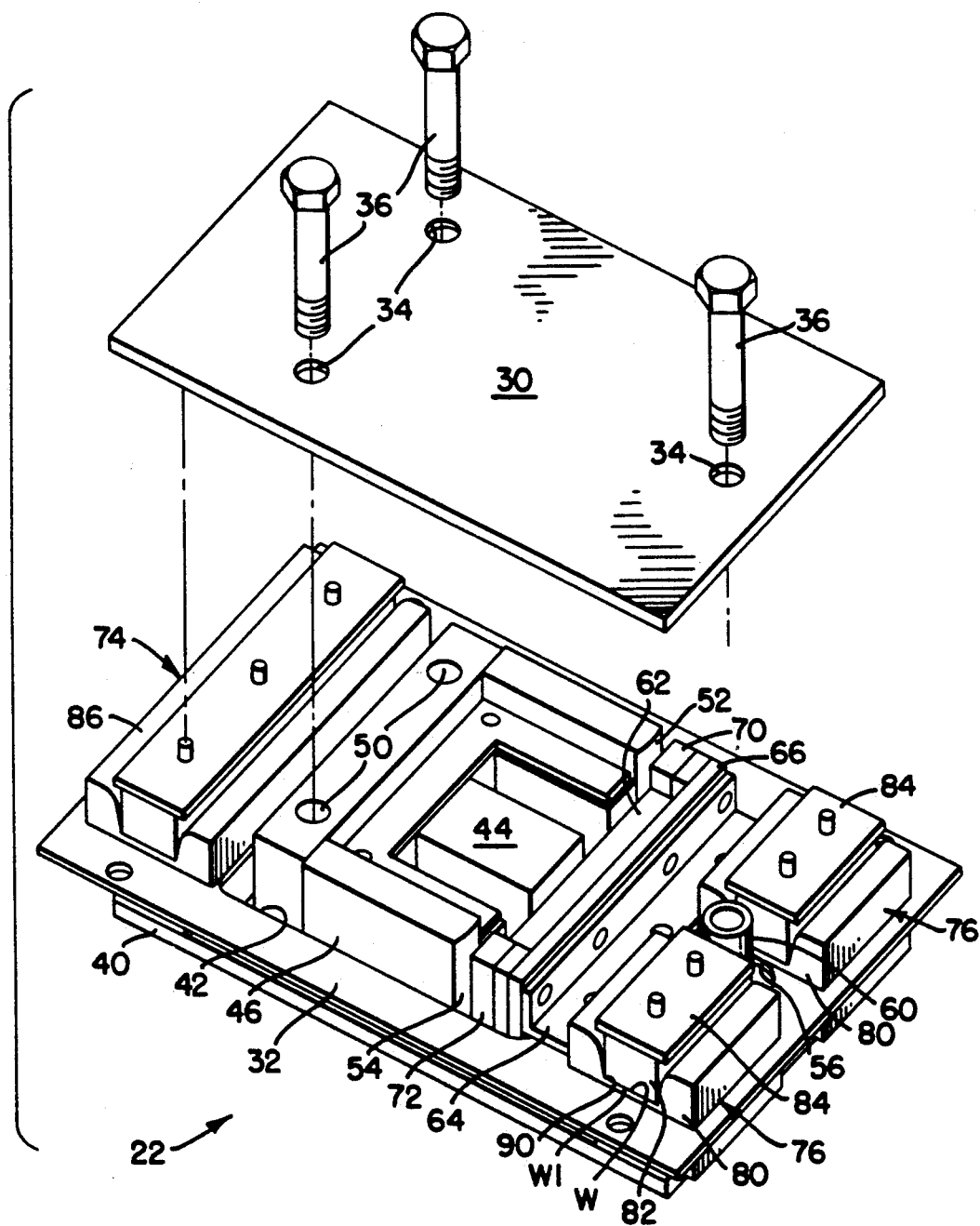
FIG_2

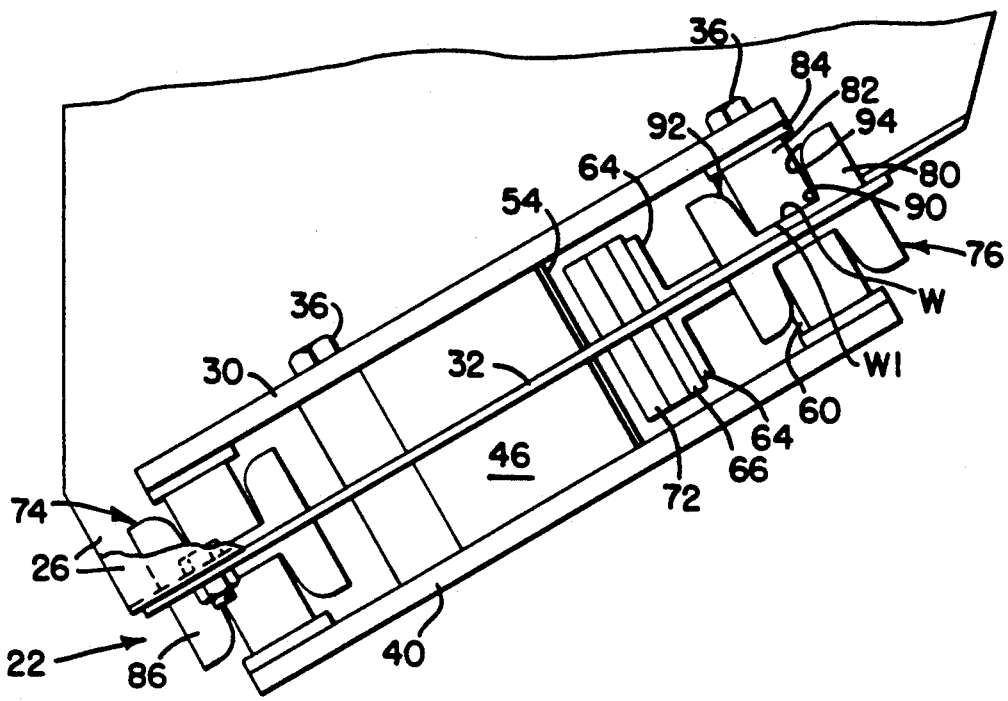
FIG_3
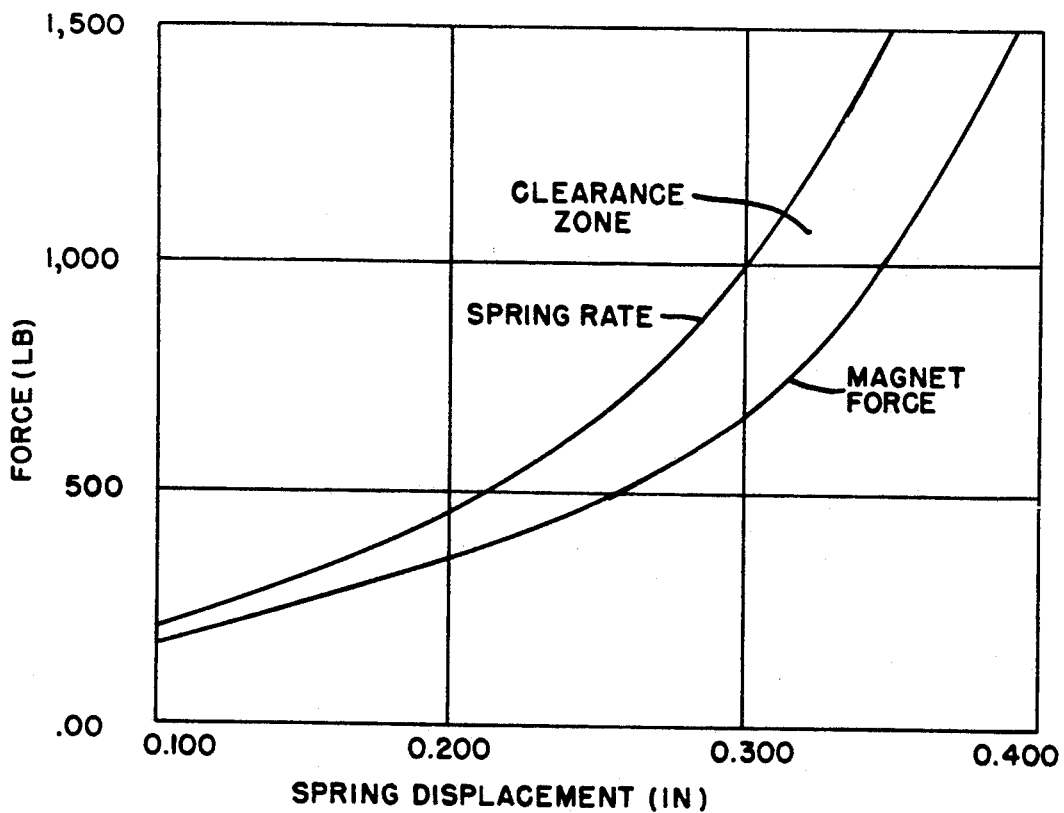
FIG_4

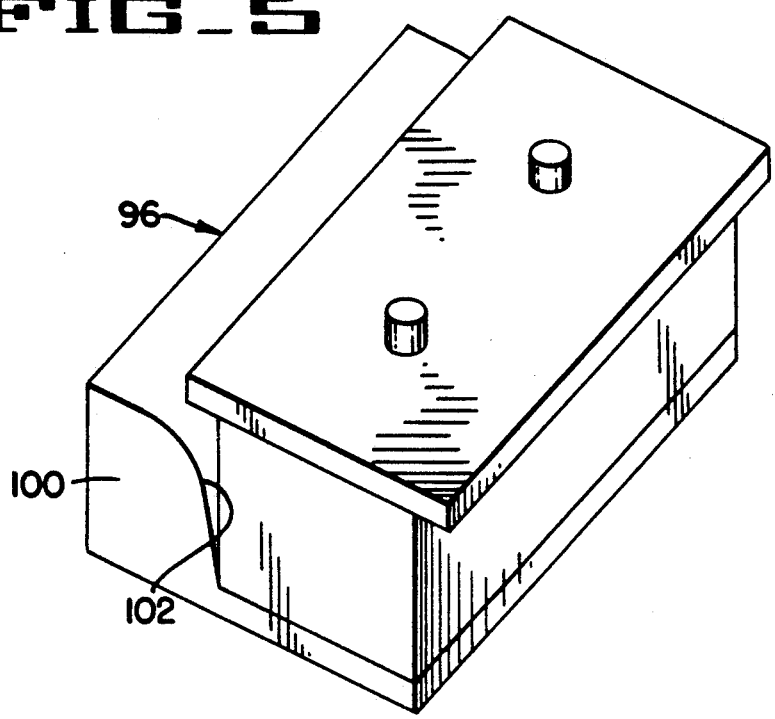
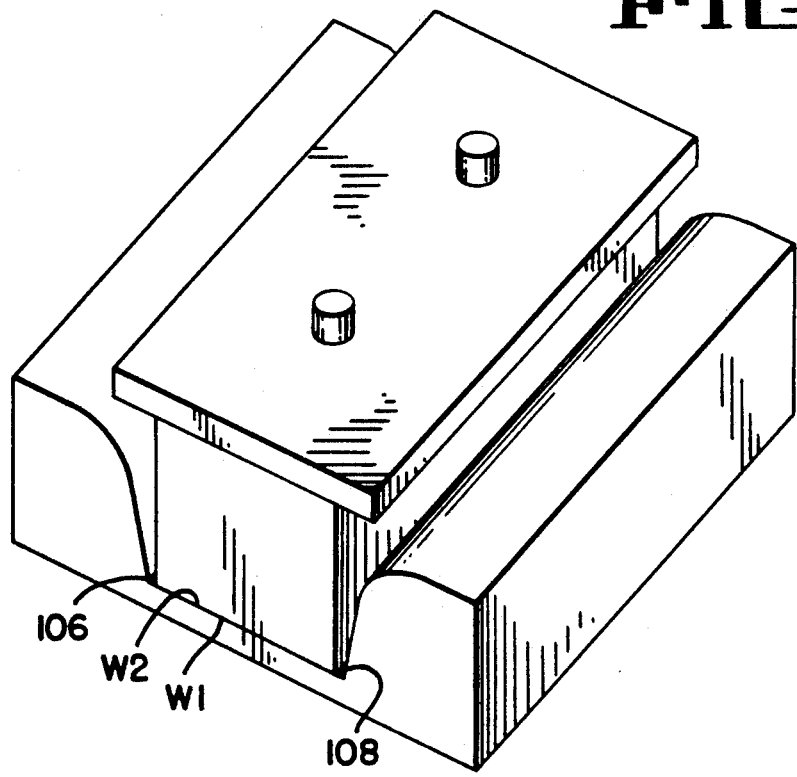

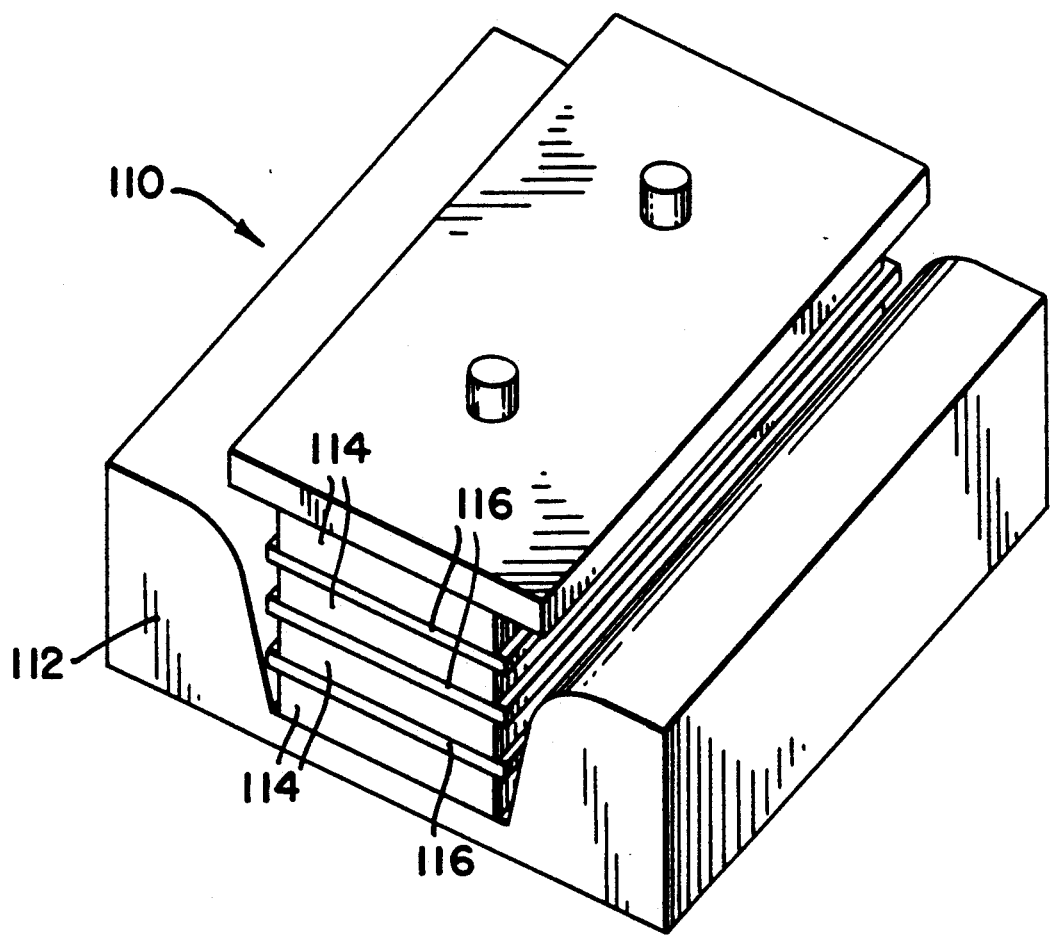
FIG_7

ELECTROMAGNETIC DRIVE FOR USE WITH VIBRATORY CONVEYORS

This invention has to do with drive systems used to power vibratory equipment such as drive systems used to drive conveyor systems. More specifically this invention has to do with techniques to tune an elastomeric spring system associated with such a drive system. Fine tuning of the spring system is determined by profiles formed in the sidewalls of the elastomeric spring retainers.

Various types of drive systems, including mechanical drive systems, as well as electrical drive systems use springs as part of the drive. This invention has to do with the spring systems used in drive systems of either electrical or mechanical systems. The preferred embodiment as described herein is an electromagnetic drive system and the invention will be described in that environment.

In the preferred embodiment contemplated by the inventor an electromagnetic drive systems is provided for driving conveyor systems which are generally two mass systems. One mass is made up of the conveyor and the armature associated with the electromagnet and the second mass is the electromagnet, its housing and any ballast. Springs, in the instant application elastomeric springs, connect the two masses and are sized to have the system utilize resonance amplification of motion.

Electromagnets produce useful force only when the pole faces are in close proximity to each other. This distance is on the order of one tenth of an inch or less in the environment of this invention. As the attraction force of the electromagnet increases approximately with the inverse of the gap squared it is desirable to have a spring system that resists the increase in force of the electromagnet in the same non-linear ratio of force to distance.

Typically elastomeric or rubber spring system allow only linear rates of spring rate rise and therefore rubber spring systems have been less preferred as spring systems in closing air gap electromagnetic drives where the rise in force generated by the electromagnet is non-linear.

An electromechanical exciter utilizes an elastomeric spring system to counteract the force of the electromagnets as the electromagnet force increases as the gap between magnet poles decrease.

Elastomeric springs which normally have a linear spring rate rise curve are housed in uniquely configured retainers that constrain the elastomeric springs as the spring is being deflected and yield a non-linear spring rate curve. The constraining walls of the housing are shaped so that the measured spring rate of the elastomeric spring is controlled as the spring is deflected.

One object of the instant invention is to provide a non-linear spring system incorporating an elastomeric spring such that the force of the spring system increase as the stroke of the electromagnet increases. With the non-linear spring system its force can be tuned to remain greater than the force generated by the electromagnet as the force generated by the magnet increases with stroke.

It should again be pointed out that the described embodiment is a preferred mode however the inventor believes that the spring systems disclosed herein could be used with equal facility in mechanical and brute force type drive systems.

These and other objects and advantages of the invention will be apparent by persons having skill in this art from the following detailed description of the invention when read in conjunction with a review of the drawing figures in which:

FIG. 1 is a simplified drawing of a conveyor showing the environment of the invention;

FIG. 2 is a perspective view of the exciter with the top plate exploded away to reveal the interior of the exciter;

FIG. 3 is an exciter as mounted in FIG. 1 with a major portion of a mounting wing plate removed to show a side elevation view of the exciter;

FIG. 4 is a graph showing a spring rate non-linear curve over an electromagnet force ratio curve;

FIG. 5 is a projected view of an alternative embodiment of a spring system;

FIG. 6 is a projected view of another alternative embodiment of a spring system;

FIG. 7 is another embodiment of the invention showing a spring system in a projected view.

Looking first at FIG. 1 the general environment of the invention can be seen. A conveyor, generally 10, is supported on legs such as 12 to a floor structure 14. A conveyor trough 16 is mounted through vibration isolators such as 20 to the legs 12. This conveyor, in a preferred embodiment, could be a conveyor having a length of eight to ten feet long and ten to twelve inches wide. Its purpose would be to feed light weight products such as snack foods, low density cereals, and other low density products. The conveyor could, of course, be of many different sizes and could be used for transporting many materials from high density materials such as coal, gravel, metallic parts to low density materials such as expanded foam packaging "peanuts".

The assignee of this invention is a manufacturer of a wide range of equipment that could use the spring system of this invention. Large "grizzle" coal handling and dewatering equipment, medium size vibratory conveyors for use in mines, cement plants, glass plants and the like, and rotary bowl parts feeders are just some of the apparatus that could use the principle of the presented herein.

The conveyor generally 10 of FIG. 1 includes two electromagnetic drive units 22 and 24 both the same except for mounting location, mounted on the conveyor by means of wing plates such as the single wing plate 26. In this embodiment the drive units are angled upwardly toward the conveyor at an approximate angle of 20 degrees from horizontal. The mounting angle is determined by the designed infeed characteristics of the machine and could vary by many degrees. Furthermore, either more or less than two units could be used on a host machine.

Turning now to FIGS. 2 and 3 the detail components of the drive units can be seen. In FIG. 3 the near side wing plate 26 has been broken away to show an elevation view of the drive unit. In FIG. 2 the top plate 30 has been removed to clearly show the drive components between the top plate 30 and a center plate 32. The center plate has a first surface and a second surface obverse to said first surface to which spring systems are attached. Components below the center plate 32 are not clear from FIG. 2 but are shown in FIG. 3 to be similar, and mounted in a mirror image, to the components above the center plate 32.

In FIG. 2 the top plate 30 is provided with apertures such as 34 to accommodate fasteners 36, hereinafter sometimes referred to as "bolts 36" which pass through the top plate to the bottom plate 40 which may be provided with threaded apertures to accommodate the threaded portion of bolts 36. The center plate 32 is provided with a large aperture 42 through which an electromagnet 44 and electromagnet housing 46 pass. The electromagnet 44 is securely housed in the electromagnet housing 46 which in turn is secured to both the top plate 30 and the bottom plate 40 by the bolts 36 passing through apertures such as 50 in electromagnet housing 46. The electromagnet housing has a critical height and acts as a spacer dictating the distance between the inside surfaces of the top and bottom plates. The legs of the electromagnet housing may also be provided with curved surfaces 52 and 54 which are shown as convex curvalinear surfaces in the preferred embodiment.

A second major aperture 56 in the center plate accommodates a spacer tube 60 which has a height the same as the height of the electromagnet housing 46 and also acts as a spacer to hold the distance between the inside surfaces of the top and bottom plates. Fastener 36 may pass through the center of the spacer tube 60 to assist in locating the tube properly.

Another item passing through the large aperture 42 in the center plate is a pole piece or armature 62 which is fixedly mounted to the center plate 32 by means of angle supports 64 on the top and bottom sides of the center plate. A spacer plate 66 may be used between the pole piece 62 and the angle supports. Rubber bumpers 70 and 72 are carried by the pole piece 62 aligned so that they can contact the curved surfaces on the housing legs 54 and 52 respectively.

The spring system of this drive is made up of several springs which are each similar to the other. In FIG. 2 three spring systems are readily apparent, these are a long spring system generally 74 and two smaller spring systems such as spring generally 76.

The spring systems are best seen in FIGS. 2 and 3. They include a spring containment base such as 80, an elastomeric spring 82 hereinafter sometimes referred to as an "elastomeric block" which is descriptive of the shape of the preferred embodiment of the so called elastomeric spring, and a spring compression means 84. In the preferred embodiment shown in FIGS. 2 and 3 each spring containment base 80 is similar in internal profile to the others although the spring system 86 is longer than the other two spring systems located between the center and top plates. In the illustrated embodiment the spring systems between the center plate and the bottom plate referred to for identification only as the bottom side elastomeric springs are mounted as mirror images of those above the center plate, which are referred to as top side elastomeric springs, as shown in FIG. 3. These springs, in alternative embodiments may be installed with the gaps facing downwardly to minimize the chance of debris from becoming lodged in the shaped section of the spring.

As shown in FIGS. 2, 3, 5 and 6 the elastomeric blocks, such as 82, have parallel sides that define a width of such blocks. The elastomeric blocks, which are shown to be rectangular in cross section and could be square in cross section are generally elongated. In most situations, and in a preferred embodiment, the length of the elastomeric blocks will be at least twice as long as they are wide.

The profile of the containment bases is formed to have an initial dimension "W" at the base of the cavity 90 that is the same as the width $W_1$" of the base of the elastomeric block 82. The width of the cavity 90 increase in width from the base of the cavity to the top portion of the cavity. In a preferred embodiment this increase is a gradual increase in width from the base of the cavity to the upper portion of the cavity where the cavity may flair out as shown at 92 and 94 (FIG. 4). The depth of the cavity less than the height of the elastomeric block 82.

The profile of the cavity is formed to yield the desired spring rate and to have the resultant rate of the elastomeric block 82 influenced by the profile to yield a non-linear spring rate from the normally linear spring rate of the elastomeric blocks. The profile of the cavity will be such that sidewall portions of the retainer are angled away from the straight vertical parallel sides of the elastomeric block at a small angle for more than fifty percent of their height. At approximately two-thirds the height of the walls the profile on the cavity diverts radically from the sides of the elastomeric block.

Various non-linear spring rate curves are possible by profiling the cavities at shallower or steeper angles than those shown in the drawing figures. The object of achieving non-linearity is graphically shown in FIG. 4 wherein the X-axis shows the displacement seen between the pole faces of the magnet and the deflection of the spring. The Y-axis shows the force in pounds generated by the magnet and the force of the springs resisting the magnet force.

In a closing air gap magnet as the magnet pole pieces approach each other the force of attraction increases non-linearly as shown by the curve labeled "MAGNET". In order to prevent the magnet pole pieces from crashing into each other when the magnet is energized the springs must resist the forces of the magnet and thus must also have a non-linear rise in spring rate. Ideally a "CLEARANCE ZONE" between the magnet force peaks and the spring force is desirable to ensure that the magnet pole pieces don't crash. A somewhat ideal situation is shown by FIG. 4 and this result is achieved by the instant application in the preferred mode shown in FIGS. 1-3.

FIGS. 5, 6 and 7 show alternative embodiments of spring containment blocks.

In FIG. 5, the half cavity spring containment block generally 96 is similar to the spring containment blocks shown earlier except that one of the profiled cavity side walls has been removed leaving a left sidewall 100 with a single ramp surface 102. The elastomeric block is the same width as the base portion of the spring containment block with the inside edge of the elastomeric block located at the lowest point of the profiled ramp surface 102.

In FIG. 6 which depicts spring system generally 104, the width of the cavity $W_2$ is greater than the width of the elastomeric block which in this example is of standard width $W_1$. This difference in width between the cavity and the elastomeric blocks results in gaps 106 and 108 between the bottom of the elastomeric block and the lowest point of the profiled ramp surface.

A fourth embodiment of the invention is shown in FIG. 7 which is a refinement of the embodiment shown in FIG. 6. In FIG. 7, which depicts a spring system generally 110, including a spring containment base 112, elastomeric slabs such as 114 are banded to intersticial aluminum plates such as 116. As the spring is deflected by the magnet force the aluminum plates will contact the cavity profiled walls and prevent the elastomeric slabs from direct contact with the cavity walls. This is thought to minimize heat build-up in the spring as the dissimilar expansion rate of the elastomeric components and the containment block will be taken out of the equation as the elastomeric slabs will expand into the area between the aluminum plates rather than contact the sidewalls of the containment block. It is expected that the material of the plates 116 is the same as the material of the cavity sidewalls or at least materials having similar termal characteristics.

It can be appreciated that there has been provided a spring system for use in a vibratory exciter and an exciter itself that fulfills the object of this invention. Various nuances of the design such as locating the electromagnet at an end of the device rather than in the middle of the device as well as multiple containment block shapes and configurations have been contemplated by the inventors and such nuances of design are believed and intended to be within the spirit and scope of the following claims herein. Furthermore exciter systems based on mechanical drive systems, as mentioned above, could be improved through the use of the spring system disclosed herein.

What is claimed:

1. A drive system for imparting vibratory motion to a driven means, said drive system comprising:
    a center plate having a plurality of apertures and an armature fixedly mounted to said center plate;
    an electromagnet supported in a magnet housing passing through one of said apertures of said center plate;
    at least one top side elastomeric spring mounted on a first surface of said center plate and at least one bottom side elastomeric spring mounted on a second surface obverse to said first surface of said center plate;
    a top plate overlaying said top side elastomeric spring; and
    a bottom plate overlaying said bottom side elastomeric spring, whereby said top plate, said bottom plate and said electromagnet housing move together as a unit sand said center plate and armature move together as a unit.

2. The invention in accordance with claim 1 wherein said top side and said bottom side elastomeric springs comprise:
    an elastomeric elongated block having parallel sides;
    a containment base for containing said elastomeric elongated block, said containment base having walls adjacent said parallel sides of said block, said walls of said containment base being non-parallel to each other and to the sides of said block.

3. The invention in accordance with claim 2 wherein said walls of said containment base are further apart from each other at an upper end of said walls than they are at a lower part of said walls.

4. The invention in accordance with Claim 3 wherein the lower part of said walls are spaced apart a distance greater than a width of said elastomeric elongated block parallel sides.

5. The invention in accordance with Claim 3 wherein said elastomeric elongated block is at least twice as long as it is wide.

6. The invention in accordance with Claim 3 wherein said elastomeric elongated block is constrained from deflection a greater degree at a lower two thirds of a height of said sides then at an upper third of a height of said sides.

7. The invention in accordance with Claim 6 wherein three top side elastomeric springs and at least three bottom side elastomeric springs are mounted to the top and bottom plates respectively.

8. The invention in accordance with Claim 1 wherein said elastomeric springs each include
    a containment base having sidewalls angled away from each other;
    an elastomeric block fixed to said containment base;
    a plate means fastened to said elastomeric block away from said containment base.

9. The invention in accordance with claim 3 wherein said containment base walls are spaced apart from each other a distance equal to a width of said elastomeric elongated block at a base of said walls and are spaced apart a greater amount at a top of said walls.

* * * * *